United States Patent [19]

Wolf et al.

[11] 4,013,328
[45] Mar. 22, 1977

[54] CABINET STRUCTURE FOR DENTAL TREATMENT ROOM

[76] Inventors: Hugo M. Wolf, 1451 NE. Glacier Lane, Minneapolis, Minn. 55421; Leo H. Wolf, 2000 Idaho Ave. South, Minneapolis, Minn. 55426

[22] Filed: Mar. 14, 1975

[21] Appl. No.: 558,322

Related U.S. Application Data

[62] Division of Ser. No. 292,478, April 3, 1972, Pat. No. 3,902,246.

[52] U.S. Cl. .................... 312/209; 312/198; 312/229; 312/250; 312/286
[51] Int. Cl.² ............... A47B 81/00; A61B 19/02; A61C 19/02; B01L 9/02
[58] Field of Search .......... 312/209, 228, 229, 292, 312/319, 327, 328, 282, 278, 279, 250, 286

[56] References Cited

UNITED STATES PATENTS

| | | | |
|---|---|---|---|
| 176,711 | 4/1876 | Townsend | 312/286 |
| 182,238 | 9/1876 | Stephenson | 312/328 |
| 469,842 | 3/1892 | Thompson | 312/328 |
| 474,357 | 5/1892 | Boldt | 312/292 |
| 487,117 | 11/1892 | Farner | 312/279 |
| 745,574 | 12/1903 | Craig | 312/282 |
| 776,519 | 12/1904 | Kelsey | 312/209 |
| 898,778 | 9/1908 | Phelan | 312/327 |
| 1,071,599 | 8/1913 | Zachara | 312/228 |
| 1,849,726 | 3/1932 | Reed | 312/278 |
| 2,101,230 | 12/1937 | Anderson | 312/198 |
| 2,523,762 | 9/1950 | Howard | 312/327 |
| 2,565,784 | 8/1951 | Sheean | 312/286 |
| 2,598,067 | 5/1952 | O'Brien | 312/328 |
| 2,764,461 | 9/1956 | Montgomery | 312/327 |
| 3,028,206 | 4/1962 | Smith | 312/229 |
| 3,087,767 | 4/1963 | Schell | 312/250 |
| 3,162,496 | 12/1964 | Morgan | 312/228 |
| 3,250,583 | 5/1966 | Phillips | 312/250 |
| 3,295,206 | 1/1967 | Sharp et al. | 312/209 |
| 3,323,852 | 6/1967 | Meyers | 312/319 |
| 3,471,209 | 10/1969 | Howard | 312/319 |
| 3,524,256 | 8/1970 | Barker | 312/209 |

*Primary Examiner*—Paul R. Gilliam
*Assistant Examiner*—V. Sakran
*Attorney, Agent, or Firm*—Burd, Braddock & Bartz

[57] ABSTRACT

A dental treatment environment having dental equipment coordinated relative to a reclining patient chair in a manner to provide minimum doctor time and motion and maximum efficiency. The chair has a patient headrest located adjacent a cabinet. An articulated first arm adjustable vertically and horizontally is movably mounted on the cabinet. The arm carries a tray useable for dental hand instruments and slow speed hand piece. An extendible and contractible second arm which moves up, down, side to side is attached to an upright support and has connected at its outer end a holder for dental high speed air turbines and air-water syringe. Both the tray and holder are movable to locations relative to the headrest whereby the transfer zone between tray and holder and patient is of minimum area. An operating light unit and its holding members are mounted on top of the support. A doctor's sink cabinet is located adjacent the doctor's side of the chair. An assistant's sink cabinet and mobile cabinet are located on the opposite side of the chair.

32 Claims, 16 Drawing Figures

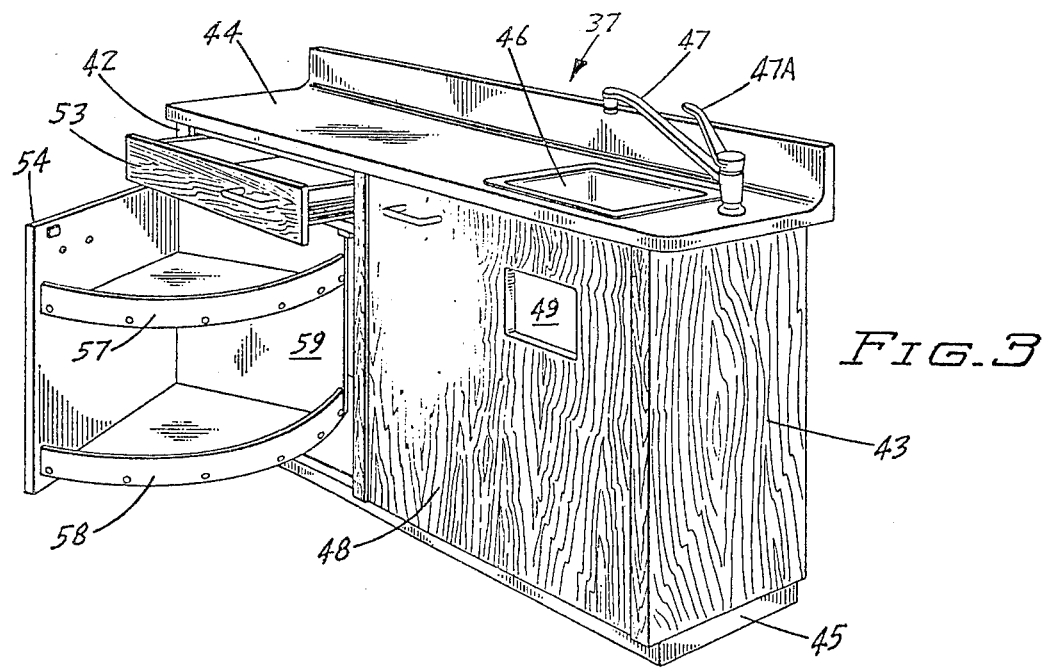
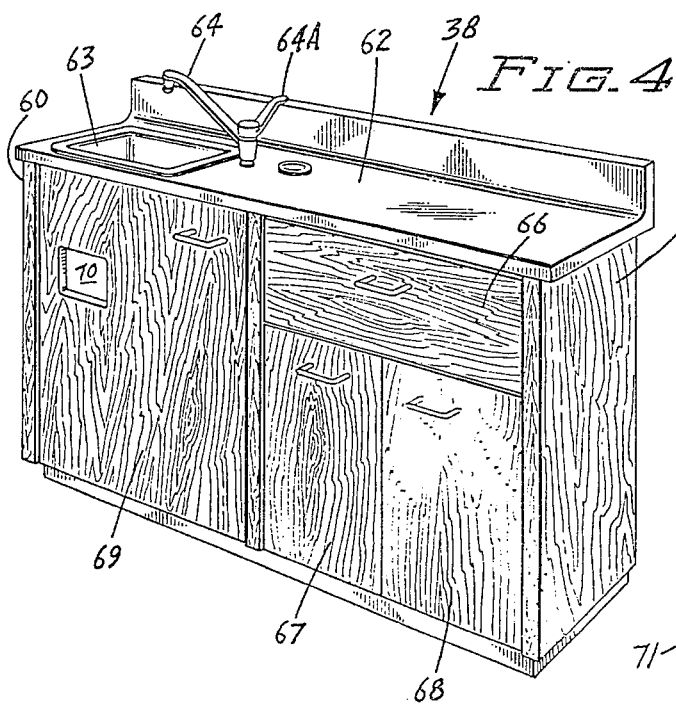
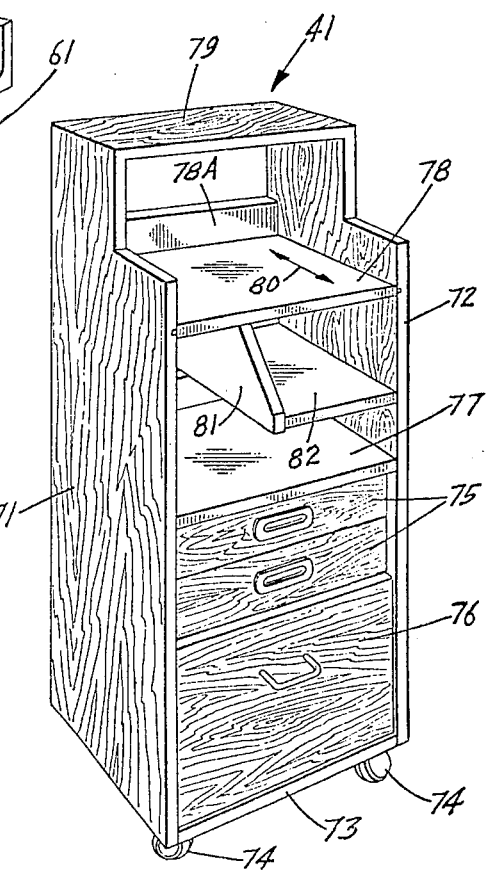

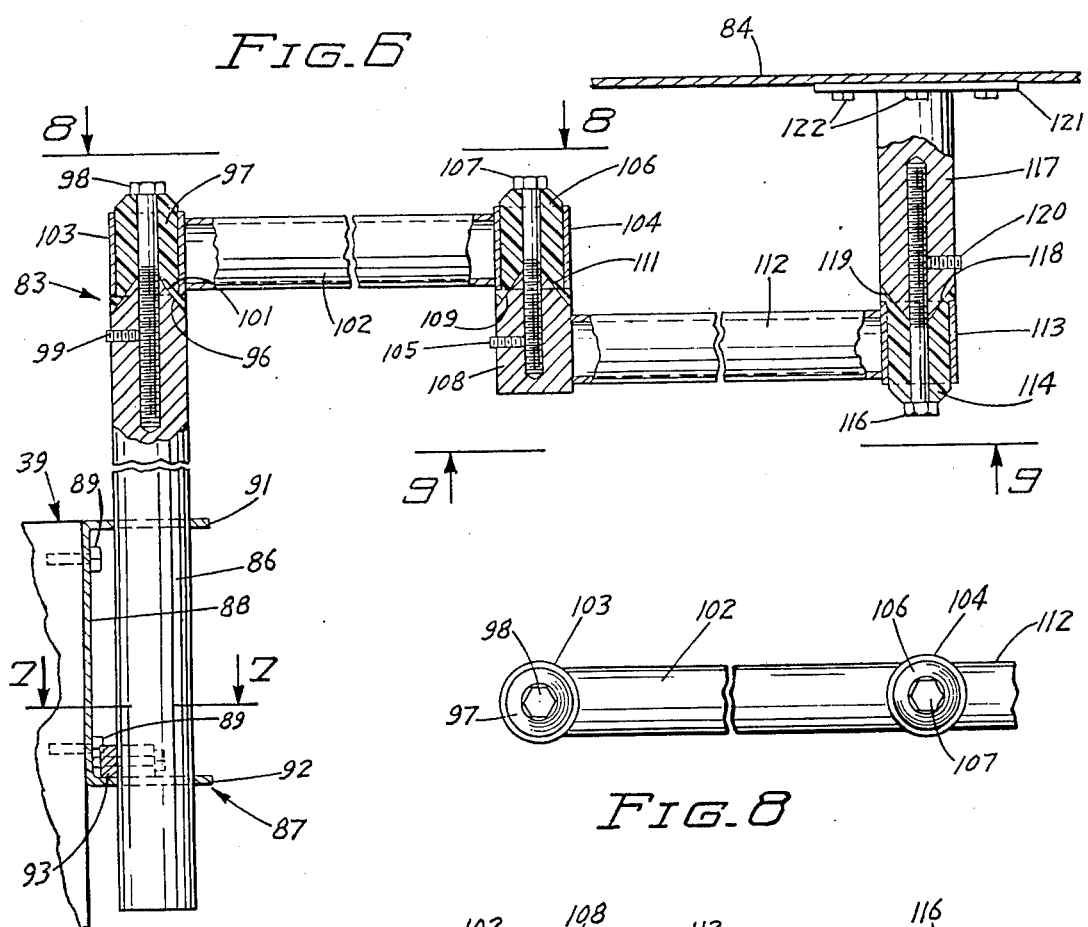
FIG. 6
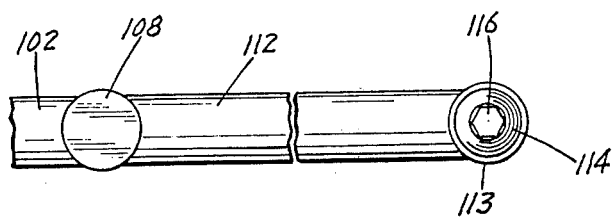
FIG. 8
FIG. 9
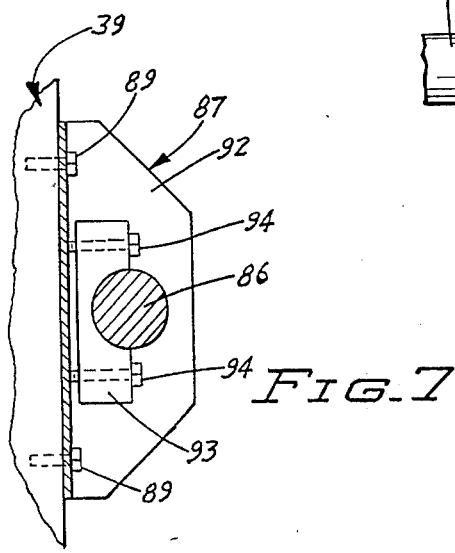
FIG. 7

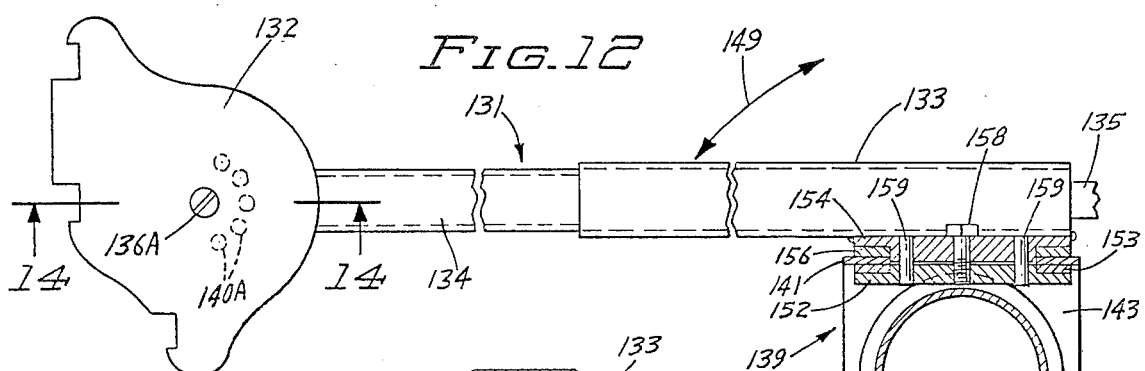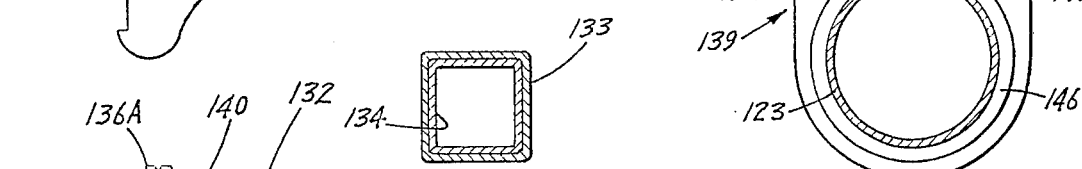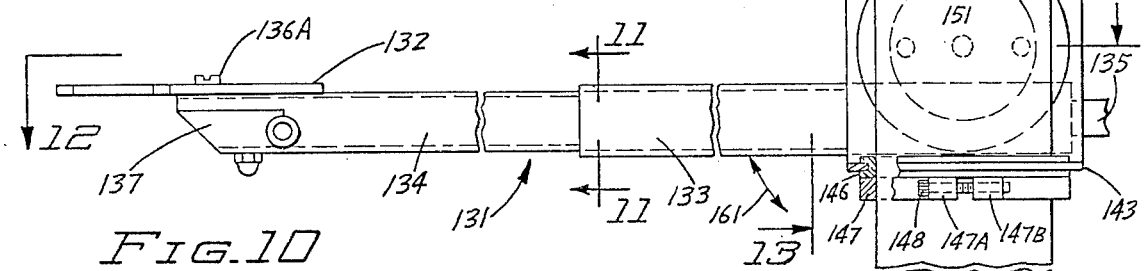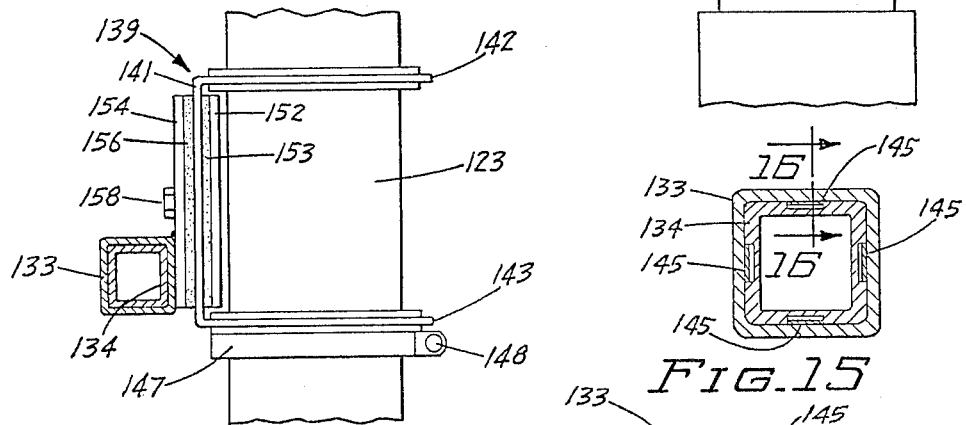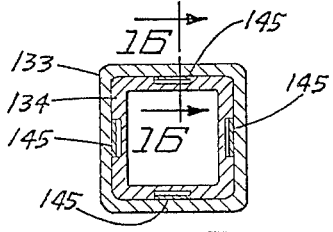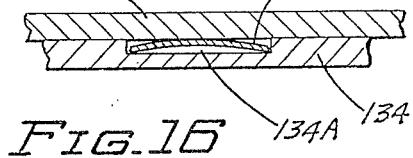

CABINET STRUCTURE FOR DENTAL TREATMENT ROOM

CROSS REFERENCE TO RELATED APPLICATION:

This application is a division of U.S. application Ser. No. 292,478 filed Apr. 3, 1972, now U.S. Pat. No. 3,902,246.

BACKGROUND OF THE INVENTION:

For many years dentists have obtained pieces of dental equipment from many sources and then tried to unite them so that they could be used together. This equipment is not designed to be readily coordinated and efficiently used with a minimum of lost time and motion. Four-handed, sit-down dentistry requires coordinated equipment and controls for the equipment for minimum doctor time and motion and maximum efficiency as well as comfort of the patient, doctor and assistant.

SUMMARY OF THE INVENTION

The invention is directed to a dental treatment room having dental equipment of character, location and dimension to provide for doctor time and motion efficiency. The room is equipped with a reclining dental chair having a headrest located adjacent a cabinet means. An articulated first arm means mounted on the cabinet means movably supports a dental instrument tray and slow speed hand piece. An upright support located adjacent the chair carries a movable second arm means. A holder on the outer end of the second arm means is operable to retain dental high speed hand pieces and air-water syringe. The support also carries the operating light and its articulated holding members. A doctor's sink cabinet is located adjacent the doctor's side of the chair. Adjacent the opposite side of the chair is an assistant's sink cabinet. This equipment is coordinated in structure and location to minimize all necessary movements of the doctor and assistant. No treatment equipment is located behind the back of the doctor or the assistant which would be inaccessible and out of reach to them.

IN THE DRAWINGS

FIG. 3 is a front perspective view of the doctor's sink cabinet with the shelf door in the open position;

FIG. 4 is a front perspective view of the assistant's sink cabinet;

FIG. 5 is a front perspective view of the assistant's mobile cabinet;

FIG. 6 is a side elevational view partly sectioned of the articulated arm supporting the instrument tray;

FIG. 7 is a sectional view taken along line 7—7 of FIG. 6;

FIG. 8 is a top plan view taken along line 8—8 of FIG. 6;

FIG. 9 is a bottom plan view taken along line 9—9 of FIG. 6;

FIG. 10 is a side elevational view of the extendible and retractable instrument arm and its support, partly sectioned;

FIG. 11 is an enlarged sectional view taken along line 11—11 of FIG. 10;

FIG. 12 is a sectional view taken along line 12—12 of FIG. 10;

FIG. 13 is a sectional view taken along line 13—13 of FIG. 10;

FIG. 14 is a sectional view taken along line 14—14 of FIG. 12;

FIG. 15 is an enlarged sectional view taken along line 15—15 of FIG. 12; and

FIG. 16 is a sectional view taken along line 16—16 of FIG. 15.

Figure 1:
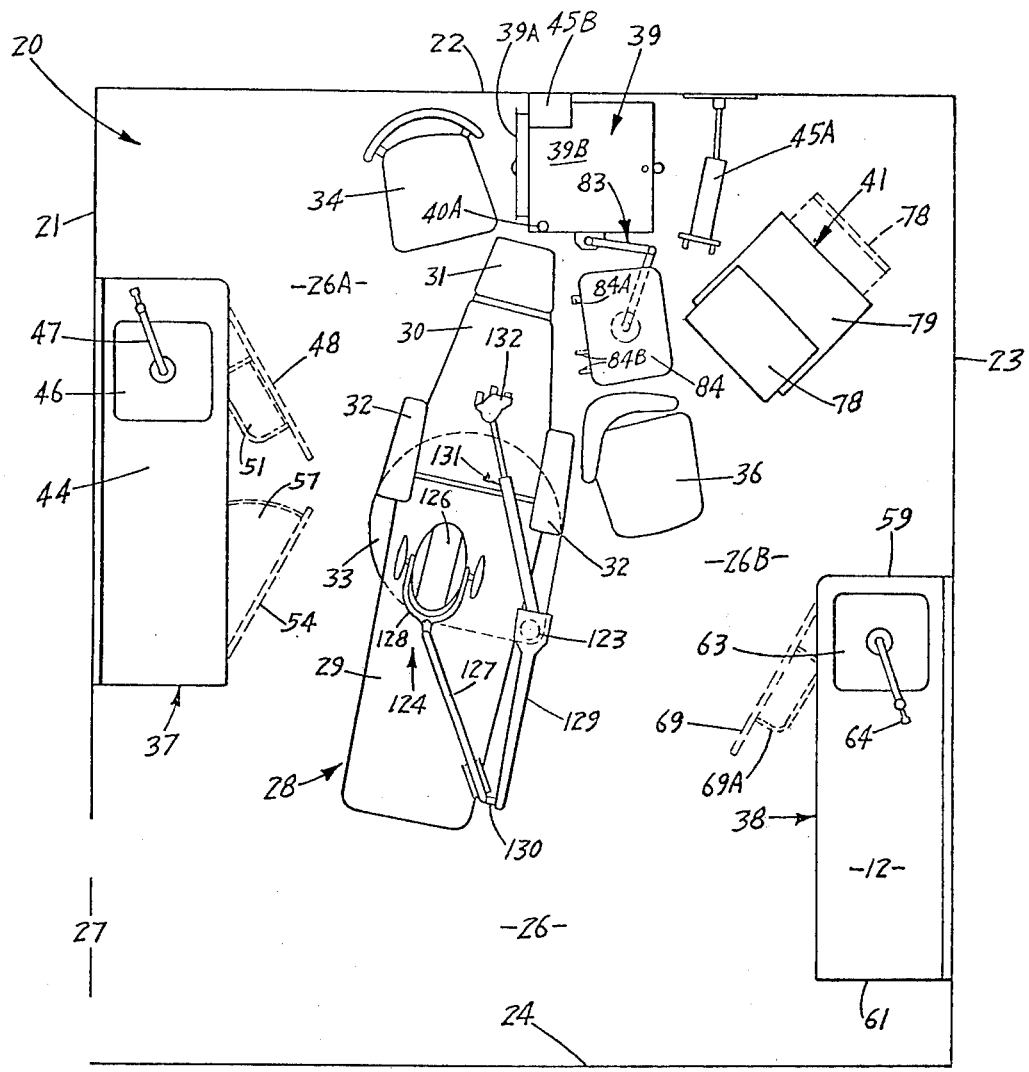
FIG. 1 is a diagrammatic plan view of a dental treatment room having the equipment and arrangement of equipment of the invention.

Referring to the drawings, there is shown in FIG. 1 a dental treatment room, indicated generally at 20, containing dental equipment coordinated and arranged according to the invention. Room 20 has a first side wall 21, back wall 22, second side wall 23 and front wall 24 defining a generally rectangular floor space 26. A doorway 27 is located between the side wall 21 and front wall 24. The doorway can be between any adjacent walls or in one of the walls. Floor space 26 has an area that conveniently accommodates the dental equipment. Preferably, floor space 26 is at least 8 feet by 9 feet, or an area of 72 square feet.

Treatment room 20 has a reclining dental chair indicated generally at 28. Chair 28 has an elongated body 29, a back rest 30, and a headrest 31. Located on opposite sides of the back rest 30 are arm rests 32. Chair 28 is held in a fixed position with the foot of the chair angled toward a doctor's sink cabinet 37. The chair support rests on a base 33. An example of the reclining dental chair is shown in U.S. Pat. Nos. 3,172,699 and 3,223,448. Other types of dental chairs can be used for the treatment room.

Chair 28 divides floor space 26 into a doctor's floor space 26A and an assistant's floor space 26B. A doctor's stool 34 is located in floor space 26A. An assistant's stool 36 is located in floor space 26B. Stools 34 and 36 have caster wheels which enable the stools to readily move on the floor relative to patient chair 28.

As shown in FIG. 1, located adjacent the left side of chair 28 against wall 21 is a doctor's sink cabinet, indicated generally at 37. An assistant's sink cabinet, indicated generally at 38, is located against wall 23 adjacent the right side of chair 28. An equipment cabinet, indicated generally at 39, is located against wall 22 and adjacent the headrest 31. A fourth mobile cabinet, indicated generally at 41, is located in assistant's floor space 26B.

Figure 2:
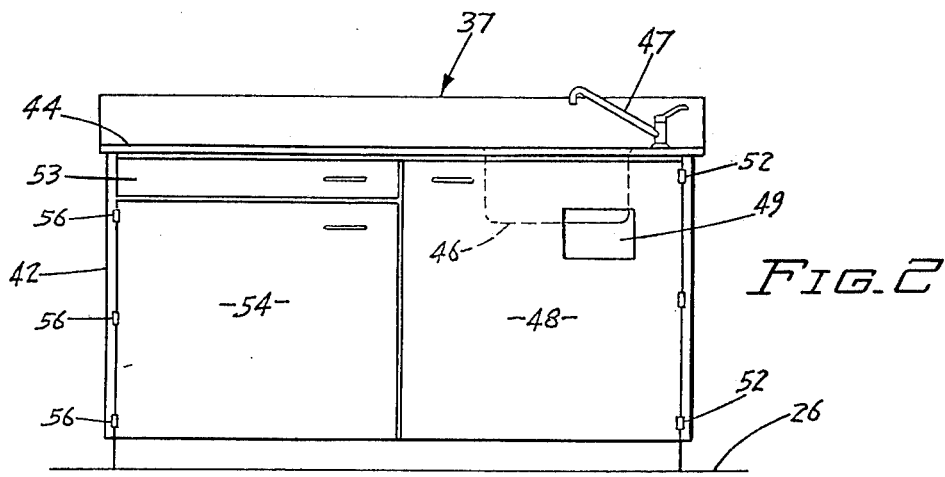
FIG. 2 is a front elevational view of the doctor's sink cabinet.

Doctor's sink cabinet 37 is located in a position adjacent the right of doctor's stool 34. Cabinet 37 is within convenient reach of the doctor's right arm in a generally aligned path with the headrest 31 of the chair 28. As shown in FIGS. 2 and 3, cabinet 37 has a pair of upright side panels 42 and 43 carrying a generally horizontal top or counter 44. Preferably, the counter 44 has a height or elevation of 26 inches from floor 26. Cabinet 37 can have adjustable legs or supports 45 whereby the height of top 44 can be selected to match the style and desire of the doctor. A sink 46 is located in the end of counter 44 closest to the doctor's stool 34. A faucet 47 having a suitable hand control 47A extends over sink 46, providing convenient access to water for the doctor seated on stool 34. Cabinet 37 has a first door 48 closing the space under the sink 46. Door 48 has a hole 49 in the upper section thereof, providing access into the interior of the cabinet. A waste container or basket 51, to receive waste material, is attached to the inside of door 48 with a suitable set of brackets. Door 48 is attached to the cabinet with hinges 52 whereby the door can be opened and waste can be removed.

A drawer 53 is slidably mounted in the cabinet immediately under counter 44 and adjacent the door 48. Located below drawer 53 is a second door 54. The outer edge of door 54, shown in FIG. 2, is connected to the panel 42 with hinges 56, whereby the door swings about a generally upright axis toward and away from patient chair 28. As shown in FIG. 3, a plurality of shelves 57 and 58 having arcuate curved outer edges are attached to the inside of door 54 so that when the door is opened, the shelves 57 and 58 face the doctor's stool 34. The inside edges of shelves 57 and 58 are attached to an upright back wall 59.

Referring to FIG. 4, assistant's sink cabinet 38 has upright side panels 60 and 61 extended downwardly from a generally horizontal top or counter 62. Preferably, counter 62 has a height or elevation of 32 inches above floor 26. Other elevations of counter 62 can be used. Located in one end of counter 62 is a sink 63. A faucet 64 having a conventional hand control 64A extends over the sink to provide water for the assistant. Cabinet 38 has a drawer 66 immediately below the counter 62 and the side opposite the sink 63. Located below drawer 66 are two doors 67 and 68 which are adapted to swing open to provide access to the space below drawer 66. The remainder of the front of cabinet 38 is closed with a door 69 which can swing open to provide access to the space below sink 63. Door 69 has a hole 70 in the upper section thereof, providing access into the interior of the cabinet. A waste container or basket 69A similar to basket 51 is attached to the inside of door 69 to receive material deposited through hole 70.

Cabinet 39 has a plurality of drawers 39A which open toward the doctor's side making the contents, as hand instruments, in the drawers conveniently accessible to the doctor. The drawers 39A are also located immediately adjacent the front of headrest 31. Cabinet 39 has a relatively low top or counter 39B. Preferably the top 39B is at an elevation of 26 inches above floor 26. The corner of top 39B adjacent headrest 31 has a nitrous oxide (analgesia) nasal mask hanger 40A. The side of top 39B opposite drawer 39A has an auxiliary instrument hanger 40B. Additional equipment, as a nitrous oxide machine 45A and X-ray machine 45B is mounted on wall 22. Machine 45A can be mounted on cabinet 41.

Mobile cabinet 41, shown in FIG. 5, has an elongated, generally upright, rectangular shape. The sides of cabinet 41 have upright panels 71 and 72. The top front portions of the panels are cut out in a stepped shape to provide more access to the top portion of the cabinet. Cabinet 41 has a generally horizontal base 73 carrying a plurality of caster wheels 74 which permit the cabinet to be moved about floor 26. The lower front portion of cabinet 41 has a plurality of pull-out drawers 75. Preferably four drawers are provided in the lower section of cabinet 41. An upwardly movable front panel 76 is used to close the front of the cabinet. As shown in FIG. 5, the panel 76 is in its down closed position. A generally horizontal sliding pull-out tray 77 covers the top of drawer space 75. Generally, horizontal track means (not shown) on the inside of panels 71 and 72 supports the tray 77 for horizontal movement into and out of the cabinet 41. Mounted on the upper portions of the side panels 71 and 72 is a generally horizontal top tray or shelf 78 having an upright transverse back stop 78A. Tray 78 is mounted on the side panels 71 and 72 with track or side means (not shown) for horizontal movement, as indicated by arrow 80, to out positions on either side of the cabinet. Located over tray 78 is a top panel 79 mounted on the top edges of side panels 71 and 72. An upright divider 81 extends between the tray 77 and the top shelf 78. A third tray 82 is located between trays 77 and 78 and is supported on one side by divider 81 and on the other side by panel 72. Tray 82 is movably mounted on track or guide means (not shown) whereby the tray can be horizontally positioned relative to the side panel 72.

As shown in FIG. 1, cabinet 39 is located immediately adjacent the front of headrest 31. The corner of cabinet 39 facing the doctor's stool 34 is in general longitudinal alignment with the chair 28. This places a substantial portion of cabinet 39 in the assistant's floor space 26B. The mid-portion of the front side of cabinet 39 carries an articulated arm, indicated generally at 83. A flat, horizontal instrument tray 84 is attached to the end of arm 83. Secured to the doctor's side of tray 84 are a vacuum hand piece hanger 84A and a slow speed hand piece hanger 84B. The arm 83 is movable so that the tray 84 can be located in contiguous relationship with the headrest 31 so that the instruments on the tray are readily accessible to the assistant and the doctor treating the patient.

Referring to FIGS. 6-9, articulated arm 83 has a vertically adjustable upright post 86 supported in a bracket 87 attached to cabinet 39. Bracket 87 has a generally flat upright back 88 attached with fasteners 89, as bolts, screws and the like, to cabinet 39. Extended outwardly from opposite upper and lower sides of the back are an upper flange 91 and a lower flange 92. Flanges 91 and 92 have suitable vertically aligned holes for accommodating post 86 and holding the post in a generally upright position. Mounted on post 86 between flanges 91 and 92 is a clamp 93. A pair of bolts 94, shown in FIG. 7, secure the clamp by exerting pressure against post 86 when bolt 94 is tightened against bracket 91.

Returning to FIG. 6, the upper end of post 86 has a cone-shaped top 96 carrying a bearing 97. A longitudinal bolt 98, projected through a suitable hole in bearing 97 and threaded into the top of post 86, holds the bearing in assembled and frictional relationship with the top of post 86. A lock set screw 99 transversely threaded in the upper end of the post engages bolt 98 to hold it in its adjusted position. Bearing 97 has a cone-shaped recess 101 accommodating the cone-shaped top 96 of the post. Bolt 98 is turned down to adjust the friction between the engaging cone surfaces of the bearing 97 and the post 86.

Extended laterally from bearing 97 is a first arm or linear member 102. A generally upright sleeve 103 is secured to one end of the arm and telescopes over bearing 97. The opposite end of arm 102 has a similar upright sleeve 104 fitted onto a bearing 106. A bolt 107 extended longitudinally through bearing 106 is threaded into a member 108 having a cone-shaped upper end 109. The lower end of bearing 106 has a cone-shaped recess 111 accommodating the upper end 109. The bolt 107 is adjustable to control the frictional drag between bearing 106 and member 108. A lock set screw 105 transversely threaded in member 108 engages bolt 107 to hold it in its adjusted position.

Secured to member 108 is a second arm or linear member 112. Member 112 is below and generally parallel to the first arm 102. The outer end of arm 112 has a generally upright sleeve 113 accommodating a bearing 114. An upright bolt 116 extends longitudinally through bearing 114 into an upright cylindrical member 117. The lower end of member 117 has a cone-shaped portion 118. The upper end of bearing 114 has a cone-shaped recess accommodating the cone end portion 118. A transverse lock set screw 120 threaded into member 117 engages bolt 116 to hold it in its selected position. Bolt 116 is useable to adjust the frictional force between the engaging cone surfaces of bearing 114 and member 117. A generally horizontal plate 121 is attached to the upper end of member 117. A tray 84 rests on plate 121 and is attached thereto with fasteners 122, as adhesive bolts, rivets or the like.

The articulated arm 83 is movable about three generally separate upright axes of bearings 97, 106 and 114. This permits the tray 84 to be moved toward and away from cabinet 39 and toward and away from the headrest 31 of chair 28. Arms 102 and 112, being located above the top surface of cabinet 39, permit the arm as well as the tray 84 to be moved to a storage position over the cabinet 39.

Returning to FIG. 1, the upright support or post 123 is located adjacent the mid-portion of the body 29 on the assistant's side of the chair 28. The lower end of post 123 is secured to base 33. Base 33 can be a large metal casting equipped with electrical service outlets for light assembly 124. Light assembly, indicated generally at 124, is attached to the top of support 123. Light assembly 124 has a lamp and reflector 126 located at the forward end of a first arm 127. A yoke 128 attached to arm 127 pivotally mounts the light assembly 124 for movement about a generally transverse axis whereby the light can be focused on the work area of the doctor. A second arm 129 is attached to the upper end of support 123 and arm 127, permitting rotational movement of the light assembly 124 about a generally upright axis. A connection 130 between the first arm 127 and the second arm 129 permits adjustment of the elevation of the light as well as the lateral movement of the light.

Mounted on support 123 below the light assembly 124 is an elongated instrument arm, or second arm, indicated generally at 131. An instrument holder 132 is attached to the outer end of arm 131. As shown in FIGS. 10 and 12, the arm 131 has a first member 133 telescopically receiving a second member 134. FIG. 11 shows the telescopic relationship between the first member 133 and the second member 134.

Referring to FIG. 14, an instrument holder 132 is pivotally mounted on top of the outer end of member 134 with an upright bolt 136A. A second upright bolt 136B is located in member 134 a short distance inwardly from bolt 136A. Bolt 136B has a head 140 projected upwardly from the top of member 134. The bottom face of holder 132 has a series of notches or recesses 140A for selectively accommodating the head 140 to position the holder 132 in a selected angular location. A U-shaped member 137 located around the end of member 134 is pivotally attached thereto with connector means 138. The member 137 is used to partially close the end of member 134 used to accommodate the electrical and fluid lines for the dental instruments (not shown). The electrical and fluid lines are located within a flexible tube 135.

As shown in FIGS. 15 and 16, the inner member 134 has longitudinal recesses 134A in each outside wall. Longitudinal outwardly flexed leaf-like springs 145 are disposed in the recesses 134A. The outer faces of the springs 145 frictionally engage adjacent faces of the inside of member 133 thereby placing a friction drag on the inner member 134. The friction drag is sufficient to hold the member 134 in its selected position.

A connector indicated at 139 attaches arm 131 to the support 123 to permit rotational movement of the arm about a generally upright axis and a generally horizontal axis. Connector 139 has a generally U-shaped base or frame having an upright back 141 attached to a horizontal upper flange 142 and a horizontal lower flange 143. The flanges 142 and 143 have aligned openings accommodating the cylindrical support 123. A first ring bearing 144 surrounds the opening and is fitted over a portion of the flange 142 to provide a bearing engagement with the support 123. A similar bearing ring 146 is located about portions of flange 143 to provide a bearing engagement with support 123. Bearings 144 and 146 are preferably of plastic material and have circular outer grooves to accommodate portions of flanges 142 and 143, as shown in FIG. 10.

The connector is adjustably held in the vertical position on support 123 with a collar 147. Collar 147 has outwardly directed ends 147A and 147B located adjacent each other. A bolt 148 extends through the ends 147A and 147B and is adjustable to clamp the collar about the support 123. As shown in FIG. 12, arm 131 pivots about support 123 in the direction of arrow 149. As shown in FIG. 10, back 141 has a circular hole 151 having a generally horizontal axis. A first disc 152 is located adjacent the inside of back 141. Disc 152 has a diameter larger than the hole 151. Secured to the outer peripheral portion of disc 152 is a washer or ring 153 of friction material, as a brake lining, engageable with an annular portion of the back 141. Located adjacent the outside of back 141 is a second disc 154. Disc 154 is substantially the same size as disc 152 and has a washer or ring 156 of friction material engageable with an outer annular portion of the back 141. A bolt 158 extended axially through a central hole in disc 154 and threaded into disc 152 functions to clamp the friction washers on the annular portion of back 141. A pair of pins 159 extend through aligned holes in the discs 152 and 154 to prevent rotation of the discs relative to each other. The inner end of member 133 is secured by welds or the like to the lower portion of disc 154 so the arm can be angularly moved to up and down positions relative to the transverse axis aligned with bolt 158 indicated by arrow 161 in FIG. 10.

In use, instrument arm 131 is extendible and retractable by moving the second member 134 into and out of the first member 133. The holder 132 can be positioned at a selected elevation by rotating the arm 131 about the transverse axis of bolt 158. Bolt 158 is turned down to vary the frictional drag of rings 153 and 156 on the back 141 whereby the arm 131 will be frictionally held at its selected elevation. The horizontal position of arm 131 can be changed by rotating the arm relative to the upright axis of the support 123. Bearing rings 144 and 146, being in light frictional engagement with the cylindrical outer face of support 123, hold arm 131 in its selected horizontal position until it is moved by the doctor or assistant.

The coordination of the dental treatment structure and equipment described and shown in the drawings is for right handed dentists. A left handed arrangement of the same structure and equipment is a mirror image of the arrangement of FIG. 1.

The embodiments of the invention in which an exclusive property or privilege is claimed are defined as follows:

1. Cabinet structures for use in a dental treatment room having a dental treatment chair having a head end and sides, the combination of a first cabinet means located adjacent the head end of the chair, second cabinet means located adjacent one side of the chair, third cabinet means located adjacent the opposite side of the chair, mobile cabinet means located between the first and third cabinet means adjacent said opposite side of the head of the chair, said second cabinet means having an upright door means located on the front of the second cabinet means, means pivotally mounting the door means on the second cabinet means for movement about a generally upright axis to selective open and closed positions, generally horizontal shelf means mounted on the inside of the door means, a drawer located above said door means, and means movably mounting the drawer on the second cabinet means for selective generally horizontal movement to an out open position and to an in closed position, said third cabinet means having a door means with an access to the interior of the third cabinet means and container means attached to the inside of the door means for storing objects moved through the opening, said mobile cabinet means having a pair of laterally spaced upright side panels, base means for carrying the side panels, a plurality of pull-out drawers movably mounted on the side panels adjacent the top of the base means, tray means movably mounted on the side panels above said drawers and coacting means on the tray means and side panels slidably mounting the tray means on the side panels for selective movement to a first out position in front of the mobile cabinet means and a second out position in back of the mobile cabinet means.

2. The structures of claim 1 including: sink means mounted on each of the second and third cabinet means.

3. The structures of claim 1 wherein: the second cabinet means includes a second door means mounted on the front of the cabinet, said second door means having an opening providing an access to the interior of the cabinet and container means attached to the inside of the second door means for storing objects moved through the opening.

4. The structures of claim 1 including: tray means for supporting dental instruments and equipment and means connecting the tray means to the first cabinet means whereby the tray means can be moved relative to the first cabinet means and generally toward and away from the head of the chair.

5. The structures of claim 1 wherein: said mobile cabinet means includes a top panel located over the tray means and secured to the side panels.

6. The structures of claim 1 wherein: said mobile cabinet means includes second tray means located below the first tray means, said second tray means being movable to an out position in front of the mobile cabinet means.

7. The structures of claim 1 wherein: said mobile cabinet means includes a plurality of wheel means secured to the base means to movably support the mobile cabinet means.

8. The structures of claim 1 wherein: the second and third cabinet means each have an upright door hinged for movement toward and away from the chair.

9. The structures of claim 1 wherein: the first cabinet means includes a plurality of drawers which open in a generally horizontal direction.

10. The structures of claim 1 wherein: the mobile cabinet means includes side panels each having top front portions cut out to provide a generally step shape to increase access to the tray means.

11. Cabinet structures for use in a dental treatment room having a dental treatment chair, the combination of first cabinet means located adjacent the head end of the chair, second cabinet means located adjacent one side of the chair, third cabinet means located adjacent the opposite side of the chair, said second cabinet means having an upright door means located on the front of the second cabinet means, means pivotally mounting the door means on the second cabinet means for movement about a generally upright axis to selective open and closed positions, generally horizontal shelf means mounted on the inside of the door means, a drawer located above said door means, and means movably mounting the drawer on the second cabinet means for selective general horizontal movement to an out open position and to an in closed position, said third cabinet means having a door means with a hole open to the interior of the third cabinet means, and container means attached to the inside of the door means of the third cabinet means for storing objects moved through the hole.

12. The structures of claim 11 including: sink means mounted on each of the second and third cabinet means.

13. The structures of claim 11 wherein: the second cabinet means includes a second door means mounted on the front of the cabinet, said second door means having an opening providing an access to the interior of the cabinet and container means attached to the inside of the second door means for storing objects moved through the opening.

14. The structures of claim 11 including: tray means for supporting dental instruments and equipment and means connecting the tray means to the first cabinet means whereby the tray means can be moved relative to the first cabinet means and generally toward and away from the head of the chair.

15. The structures of claim 11 wherein: the second and third cabinet means each have an upright door hinged for movement toward and away from the chair.

16. The structures of claim 11 wherein: the first cabinet means includes a plurality of drawers which open in a generally horizontal direction.

17. Cabinet structures for use in a dental treatment room having a dental treatment chair, the combination of first cabinet means located adjacent the head end of the chair, second cabinet means located adjacent one side of the chair, mobile cabinet means located adjacent one side of the head of the chair, said mobile cabinet means having a pair of laterally spaced upright side panels, base means for carrying the side panels, a plurality of pull-out drawers movably mounted on the side panels adjacent the top of the base means, tray means movably mounted on the side panels above said drawers and coacting means on the tray means and side panels slidably mounting the tray means on the side panels for selective movement to a first out position in front of the mobile cabinet means and a second out position in back of the mobile cabinet means, said tray means including a first tray and a second tray, said second tray being narrower than the first tray and an upright divider connected to an edge of the second tray and connected to the first tray.

18. The structures of claim 17 wherein: said second cabinet means has an upright door means located on the front of the second cabinet means, means movably mounting the door means on the second cabinet means for movement about a generally upright axis to selective open and closed positions, and generally horizontal shelf means mounted on the inside of the door means.

19. The structures of claim 17 including: sink means mounted on the second cabinet means.

20. The structures of claim 17 wherein: the second cabinet means includes a second door means mounted on the front of the cabinet, said second door means having an opening providing an access to the interior of the cabinet and container means attached to the inside of the second door means for storing objects moved through the opening.

21. The structures of claim 17 including: tray means for supporting dental instruments and equipment and means connecting the tray means to the first cabinet means whereby the tray means can be moved relative to the first cabinet means and generally toward and away from the head of the chair.

22. The structures of claim 17 wherein: said mobile cabinet means includes a top panel located over the tray means and secured to the side panels.

23. The structures of claim 17 wherein: said mobile cabinet means includes second tray means located below the first tray means, said second tray means being movable to an out position away from the side panels.

24. The structures of claim 17 wherein: said mobile cabinet means includes a plurality of wheel means secured to the base means to movably support the mobile cabinet means.

25. The structures of claim 17 wherein: the first cabinet means includes a plurality of drawers which open in a generally horizontal direction.

26. The structures of claim 17 wherein: the mobile cabinet means includes side panels each having top front portions cut out to provide a generally step shape to increase access to the tray means.

27. Cabinet structures for use in a dental treatment room having a dental chair, the combination of: first cabinet means located adjacent one side of the chair, mobile cabinet means located adjacent the opposite side of the chair, said first cabinet means having a sink, said mobile cabinet means having a pair of laterally spaced upright side panels, base means for carrying the side panels, a plurality of pull-out drawers movably mounted on the side panels adjacent the top of the base means, tray means movably mounted on the side panels above said drawers and coacting means on the tray means and side panels slidably mounting the tray means on the side panels for selective movement to a first out position in front of the mobile cabinet means and a second out position in back of the mobile cabinet means.

28. The structures of claim 27 wherein: said first cabinet means has an upright door means located on the front of the first cabinet means, means pivotally mounting the door means on the first cabinet means for movement about a generally upright axis to selective open and close positions, and generally horizontal shelf means mounted on the inside of the first cabinet means, means pivotally mounting the door means on the first cabinet means for movement about a generally upright axis to selective open and close positions, and generally horizontal shelf means mounted on the inside of the door means.

29. The structures of claim 27 wherein: said mobile cabinet means includes a top panel located over the tray means and secured to the side panels.

30. The structures of claim 27 wherein: said mobile cabinet means includes second tray means located below said tray means, said second tray means being movable to an out position away from the side panels.

31. The structures of claim 27 wherein: said mobile cabinet means includes a plurality of wheel means secured to the base means to movably support the mobile cabinet means.

32. The structures of claim 27 wherein: said mobile cabinet means include side panels each having the top front portions cut out to provide generally step shape to increase access to the tray means.

* * * * *